(No Model.)
C. T. LITCHFIELD.
ORE CONCENTRATOR AND SEPARATOR.
No. 351,057. Patented Oct. 19, 1886.
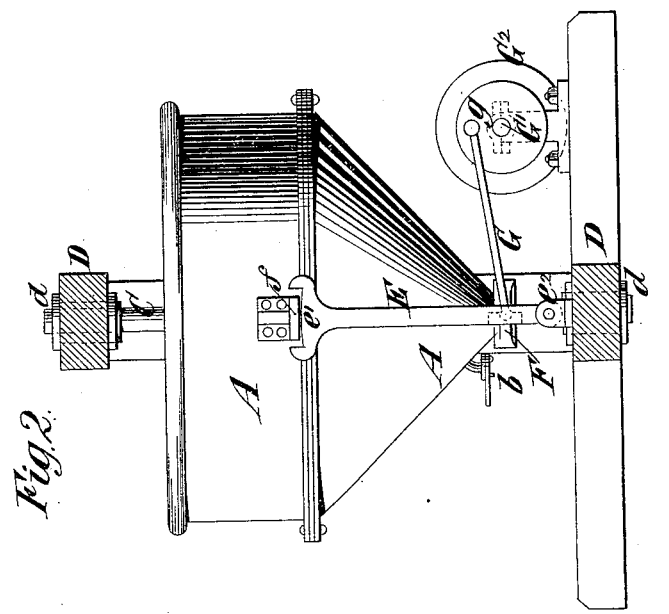
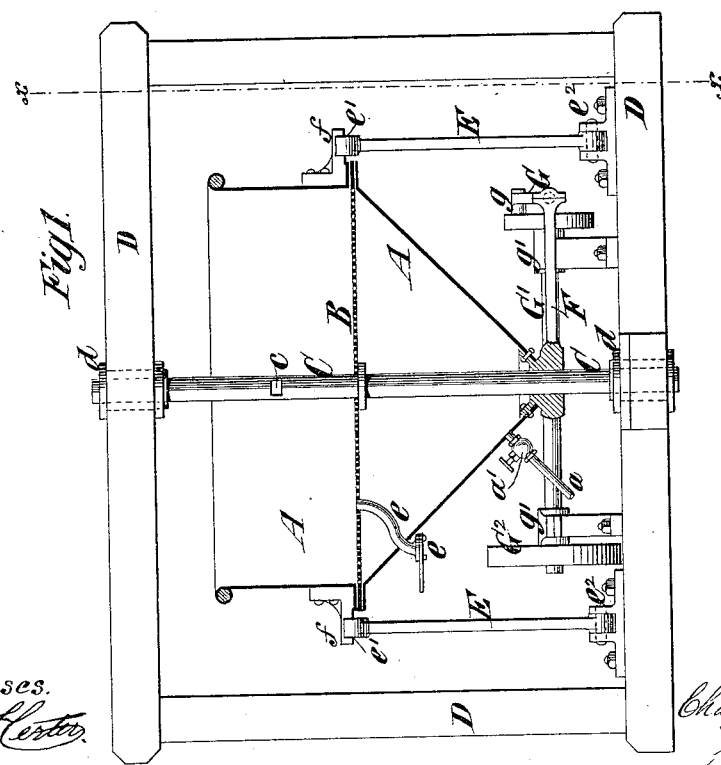
Witnesses.
Inventor
Chas T Litchfield
by his attys
Brown & Hall

UNITED STATES PATENT OFFICE.

CHARLES T. LITCHFIELD, OF SILVER CLIFF, COLORADO.

ORE CONCENTRATOR AND SEPARATOR.

SPECIFICATION forming part of Letters Patent No. 351,057, dated October 19, 1886.

Application filed January 13, 1886. Serial No. 188,427. (No model.)

*To all whom it may concern:*

Be it known that I, CHARLES T. LITCHFIELD, of Silver Cliff, in the county of Custer and State of Colorado, have invented a new and useful Improvement in Ore Concentrators and Separators, of which the following is a specification.

My invention relates to that class of ore concentrators and separators which severally consist of a vessel so mounted that it is capable of an oscillating motion, and provided with a water-inlet, an exit-gate or discharge for fine ore, and an overflow for water and gangue or waste material.

My machine comprises a vessel which is mounted so that it is capable of oscillation about a vertical axis, and has an upward and downward movement, and which is divided by a laterally-extending perforated partition or sieve, the portion of the vessel below such partition or sieve being preferably of inverted conical form. The water-inlet pipe communicates with the lower portion of the vessel below the partition or sieve, and that portion of the vessel is also provided with an exit-gate for fine ore. The axis of the vessel, about which it oscillates, may be formed by a hollow shaft or pipe, which may be held stationary in the frame-work, and which is provided above the perforated partition or sieve with a side opening, forming an overflow for the water and gangue or waste material in the vessel, the overflow water being conducted downward through the hollow shaft or pipe. The vessel also has attached to it a laterally-extending arm, which may be operated from a shaft through a crank and connecting-rod or other suitable connections, so as to impart an oscillating motion to the vessel. I also provide the vessel with laterally-projecting bearers, supported by arms or hangers, which are provided at their one end with seats for the bearers and are pivoted at their other end. Such arms or hangers for supporting the vessel provide for a slight rising and falling motion in addition to its turning about a central axis, and thereby conduces to the proper separation and concentration of the finer and richer ore from the coarser material.

The invention consists in the novel combinations of parts which are hereinafter described, and pointed out in the claims.

In the accompanying drawings, Figure 1 is a sectional elevation of a machine embodying my invention, and Fig. 2 is a vertical section thereof upon the plane of the dotted line $x\ x$, Fig. 1.

Similar letters of reference designate corresponding parts in both figures.

A designates the separating and concentrating vessel, which is here represented as arranged to oscillate about a vertical axis. The upper portion of this vessel is represented as cylindric, and the lower portion is of inverted conical form. At the upper end of the conical bottom of the vessel is a perforated partition or sieve, B, which may be of finely-perforated metal, wire-gauze, or other suitable material, and which is fixed in the vessel so as to move therewith. The vessel A should be provided below the perforated partition or sieve B with a water-inlet and an exit-gate for fine ore, and it should have above such partition or sieve an overflow for water and gangue or waste material.

As here represented, $a$ designates the water-inlet pipe, which is controlled by a cock or valve, $a'$. $b$ designates the exit-gate or discharge for fine ore, which is near the bottom of the vessel, and $c$ designates the overflow-opening which is formed in the hollow shaft or pipe C.

As here represented, the vessel is fixed to the hollow shaft or pipe, and this shaft or pipe is properly supported at its top and bottom in bearings $d$ in a suitable frame-work, D, and the vessel and its partition or sieve B oscillate about the axis of this shaft or pipe C. I have also shown an outlet pipe and gate, $e$, for coarse ore which will not pass through the openings in the perforated partition or sieve B, and which is shown in Fig. 1.

In order to impart an upward and downward motion to the vessel A, I may employ hangers or arms E, which at their one end are provided with seats $e'$ and at their other end are pivoted, as represented at $e^2$. The seats $e'$ support bearers $f$, which project from opposite sides of the vessel, and these bearers $f$ may move freely upon the seats $e'$ as the arms E vibrate in vertical planes which are tangential to a circle larger in diameter than the vessel A.

F designates an arm which is securely fastened to the lower part of the vessel or to the shaft or pipe C. This arm F projects laterally from the vessel, and has connected with its outer end by a ball-and-socket joint a connecting-rod, G, which receives motion from a crank, $g$, upon a driving-shaft, G'. This shaft is supported in suitable bearings, $g'$, and has upon it a pulley, $G^2$, whereby rotary motion may be imparted to it by a belt.

In the use of my machine the crushed or broken ore is introduced in the vessel A, above the perforated partition or sieve B, and water is introduced through the pipe $a$ by a pump, or from a constant source of pressure, such as an elevated reservoir. The lower portion of the vessel A is filled with water, and the upper portion also up to the level of the overflow-opening $c$. By the oscillating and rising-and-falling motion which the vessel receives the finer particles of ore are separated from the coarser material, and pass downward through the sieve B, and are deposited in the lower part of the vessel. Such fine ore may be withdrawn through the exit-gate $b$. After the material above the perforated partition or sieve B has been freed from all its finer ore or particles, such coarse material may be withdrawn from the pipe and gate $e$, the lighter or waste particles of ore passing off with the water from the overflow-opening $c$. The downward jar which the vessel receives at the end of the motion of the arms or hangers E in either direction as the vessel settles to its bearings thereon conduces to the effective separation and concentration of the finer particles of the ore.

I am aware that it is not new to impart to a concentrating-pan an oscillating motion about a vertical axis, and hence I do not claim this broadly as of my invention.

What I claim as my invention, and desire to secure by Letters Patent, is—

1. The combination, with a vessel having fixed within it a laterally-extending partition or sieve, and a shaft and connections for imparting to the vessel, with its partition or sieve, an oscillating motion about the axis of the vessel, of a water-inlet pipe and a discharge for fine ore, both connected with the vessel below the partition or sieve, and an overflow for water and gangue or waste material, arranged above the partition or sieve, substantially as herein described.

2. The combination, with a vessel having a laterally-extending perforated partition or sieve, and a shaft and connections for imparting to it an oscillating motion about its axis and an upward and downward motion, of a water-inlet pipe and a discharge for fine ore, both connected with the vessel below the partition or sieve, and an overflow for water and gangue or waste material, arranged above the partition or sieve, substantially as herein described.

3. The combination, with a vessel having a laterally-extending perforated partition or sieve, and provided with a water-inlet, a discharge for fine ore, and a water-overflow, as described, of bearers projecting from the sides of the vessel, arms or hangers pivoted at their one end and provided at their opposite end with seats for the bearers, an arm attached to and projecting rigidly from the vessel, and a shaft and connections between it and said rigid arm, whereby an oscillating motion is imparted to the vessel, substantially as herein described.

4. The combination, with a vessel having a laterally-extending perforated partition or sieve, and having an inverted conical form below the sieve, of a water-inlet and a discharge for fine ore, as described, an upright hollow shaft or pipe provided above the sieve with an overflow-opening for water and gangue or waste material, and a shaft and connections whereby an oscillating motion is imparted to the vessel, substantially as herein described.

5. The combination, with the vessel A, having the perforated partition or sieve, and having a water-inlet, a discharge for fine ore, and a water-overflow, as described, of the bearers $f$, projecting from the vessel, the arms E, pivoted at their lower ends and having at their upper ends seats $e'$ for said bearers, the arm F, projecting from the vessel, and a shaft and connections between it and said arm for imparting an oscillating motion to said vessel, substantially as herein described.

CHAS. T. LITCHFIELD.

Witnesses:
C. HALL,
FREDK. HAYNES.